W. L. BENNETT.
COMBINED FENDER AND WHEEL BRAKE.
APPLICATION FILED JULY 22, 1914.

1,164,569.

Patented Dec. 14, 1915.
2 SHEETS—SHEET 1.

Witnesses
W. S. McDowell
R. M. Smith

Inventor
William L. Bennett,
By Victor J. Evans
Attorney

W. L. BENNETT.
COMBINED FENDER AND WHEEL BRAKE.
APPLICATION FILED JULY 22, 1914.
1,164,569.
Patented Dec. 14, 1915.
2 SHEETS—SHEET 2.
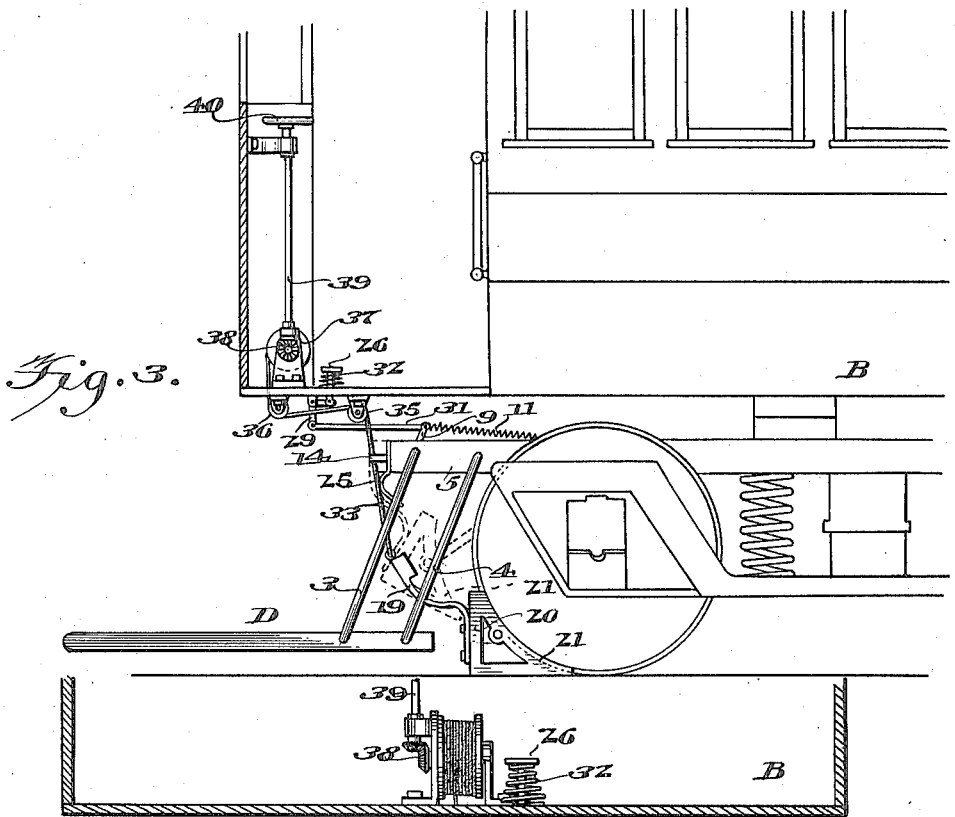
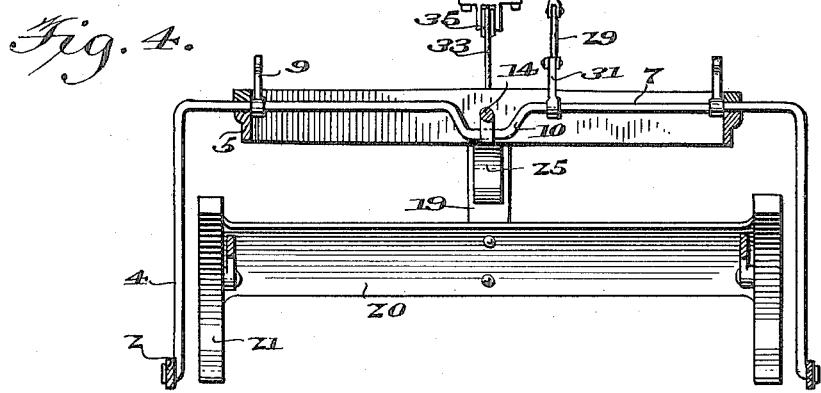
Witnesses
W. S. McDowell
P. M. Smith
Inventor
William L. Bennett,
By Victor J. Evans
Attorney

UNITED STATES PATENT OFFICE.

WILLIAM L. BENNETT, OF DOWNINGTOWN, PENNSYLVANIA.

COMBINED FENDER AND WHEEL-BRAKE.

1,164,569. Specification of Letters Patent. Patented Dec. 14, 1915.

Application filed July 22, 1914. Serial No. 852,447.

*To all whom it may concern:*

Be it known that I, WILLIAM L. BENNETT, a citizen of the United States, residing at 118 Webster avenue, Downingtown, in the county of Chester and State of Pennsylvania, have invented new and useful Improvements in Combined Fenders and Wheel-Brakes, of which the following is a specification.

This invention relates to railway car fenders and emergency brakes, the object in view being to provide an emergency brake, and a fender so combined therewith and with the car truck that when the fender comes in contact with a person or object, it automatically trips the brake mechanism, resulting in an immediate application of the emergency brake.

A further object of the invention is to provide means whereby the brake mechanism may be tripped by the motorman independently of the operation of the fender; also manually controlled means for restoring the brake mechanism to its non-braking position.

With the above and other objects in view, the invention consists in the novel construction, combination and arrangement of parts, as herein described, illustrated and claimed.

Figure 1:
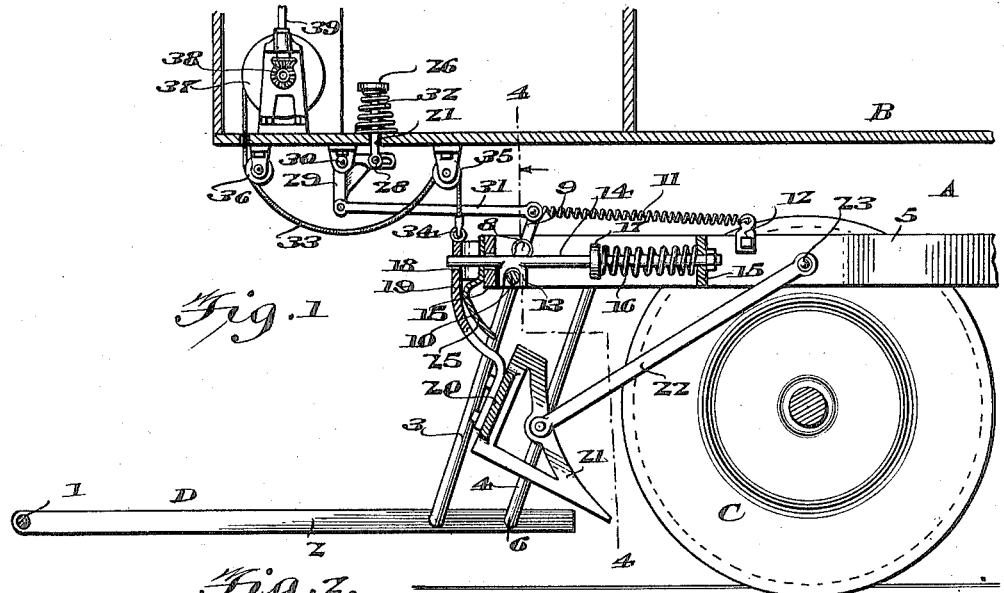
Figure 2:
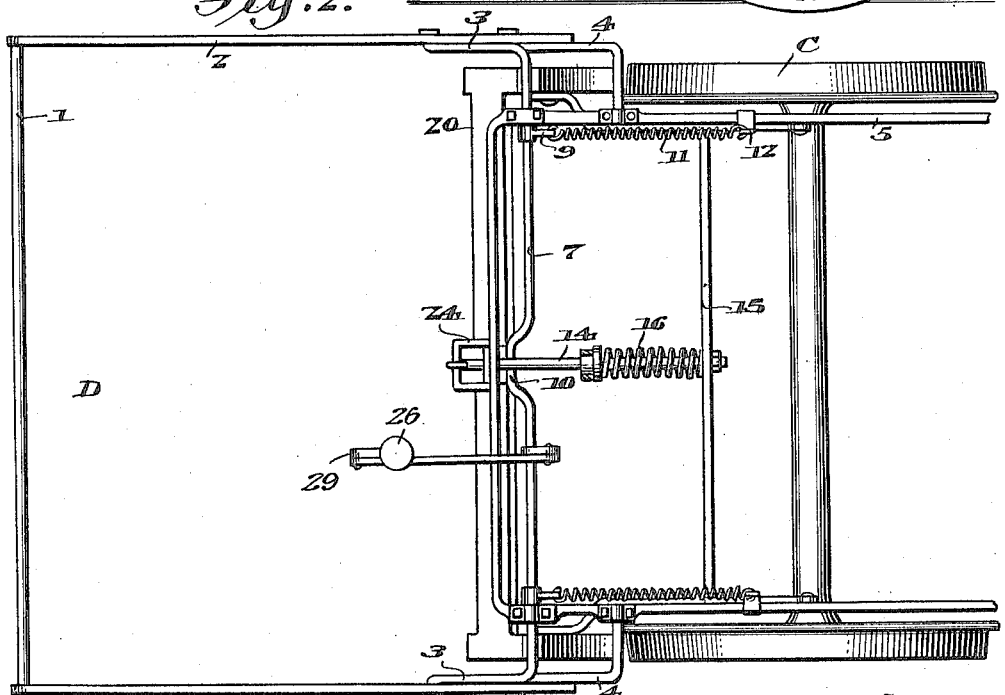

In the accompanying drawings:—Figure 1 is a side elevation partly in section of one end of a railway car, showing the brake and fender of this invention applied thereto. Fig. 2 is a plan view of the truck omitting the car body and showing the mechanism of this invention applied to the truck. Fig. 3 is a view similar to Fig. 2 showing the braking position of the shoes. Fig. 4 is a vertical cross section on the line 4—4 of Fig. 1.

Referring to the drawings A generally designates a car truck and B a car body, the truck being equipped with the usual wheels C.

D generally designates a fender frame shown as comprising oppositely arranged side bars 1 and a front cross bar 2 which is adapted to come in contact with a person or object, the fender frame being supported and held in a substantially horizontal position by means of parallel hanger arms 3 and 4, the arms 4 being shown in the form of links which are pivotally connected at their upper ends to the side bars 5 of the truck frame and pivotally connected at their lower ends to the side bars 1 of the fender frame. The arms 3, which are arranged in advance of the links and in parallel relation thereto as shown in Figs. 1 and 3, are formed on the opposite extremities of a horizontal rock shaft 7 extending transversely of the truck frame and journaled therein at 8. The rock shaft 8 is provided in addition to the hanger arms 3 with lever arms 9 and a crank arm 10, the lever arms 9 having connected thereto the forward extremities of a pair of rearwardly extending contractile springs 11 which are fastened at their rear extremities to brackets 12 on the side bars 5 of the truck frame. The springs 11 serve to sustain the fender frame yieldingly at the forward limit of its movement and also at a suitable distance above the track to provide for the proper clearance under ordinary conditions.

The crank arm 10 engages a forked or slotted extension 13 on a latch bolt 14 which is slidingly mounted in bearings or guides 15 of the truck frame as clearly illustrated in Fig. 1, said bolt being held yieldingly in a forward direction by means of a coiled expansion spring 16 which surrounds the sliding bolt 14 and is interposed between the rear guide or bearing 15 and a collar 17 on said bolt. The forward extremity of the bolt 14 passes through a hole 18 in an upwardly extending arm 19 of a brake beam 20 which carries a pair of wedge-shaped brake shoes 21, said shoes being supported by swinging links 22 which are pivotally connected to the truck frame at 23, said links being of such length and having their pivots 23 so arranged that when the brake beam and shoes are released, the brake shoes will be carried simultaneously against the wheels and track rails, thereby arresting the rotation of the wheels and causing the shoes to slide on the rails until the car is brought to a stop.

As soon as the front bar 1 of the fender comes in contact with a person or object, the fender frame is shifted rearwardly and thereupon the crank arm 10 operates to withdraw the slidable bolt 14 from the hole 18 in the arm 19. This permits the brake beam and shoes to move to braking positions as previously indicated.

The arm 19 is provided with rearwardly extending flanges or ears 24 which, as the brake beam is raised to its non-braking position, slide against a deflecting plate 25 to enable the arm 19 to snap over the end of the locking bolt 14, the brake beam and shoes being thereby held clear of the wheels and rails. The brake mechanism may be tripped independently of the operation of the fender by means of a pedal 26 arranged to be operated by the motorman, said pedal being provided with a stem 27 which has a jointed connection at 28 with a bell crank lever 29 pivotally mounted at 30 under the platform and connected by a link 31 to one of the lever arms 9. The pedal 26 is normally sustained in an elevated position by means of a coiled expansion spring 32 surrounding the stem 27 and interposed between the pedal 26 and the platform.

The means for restoring the brake beam and shoes to their non-braking position comprises a flexible connection 33, such as a cable, one end of which is connected at 34 to the upper extremity of the latch arm 19. The cable 33 passes over guide pulleys 35 and 36 and is adapted to be wound upon a drum 37 which is connected by miter gears 38 to a substantially vertical winding shaft 39 provided at its upper extremity with a hand wheel 40 or its equivalent within reach of the motorman.

From the foregoing description taken in connection with the accompanying drawings it will now be seen that the brake mechanism may be tripped either automatically, by the coöperation therewith of the shiftable fender, or manually, by means under control of the motorman. It will also be understood that the motorman may restore the parts to their initial positions without descending from the platform of the car. When the fender strikes a person or object, such person or object is picked up by the fender and simultaneously therewith the emergency brake mechanism is unlatched or released and permitted to move to braking position, the brake shoes simultaneously engaging the wheels and rails and bringing the car to a standstill within a short distance.

What I claim is:—

1. In a railway car the combination with a brake beam, and brake shoes attached to said beam, of a latch for sustaining said beam and shoes in non-braking position, a fender mounted for movement in a fore and aft direction, means actuated by the rearward movement of the fender for tripping said latch to release the brake beam and permit the brake shoes to move to braking position, manually controlled means for restoring said brake beam and shoes to non-braking position, and means for operating automatically and independently of the brake mechanism to return the fender to its initial position.

2. In a railway car, the combination with a brake beam, and combined wheel and track brake shoes attached to said beam, of swinging links connecting said shoes to the truck frame, an arm extending from said brake beam, a spring thrust latch for sustaining said beam and shoes in non-braking position, a horizontally disposed fender, parallel motion links connecting said fender to the truck frame, and a rock shaft operated by one set of the last named links and having an offset portion which operates to trip said latch to release said brake beam and shoes and permit the latter to move to braking position.

In testimony whereof I affix my signature in presence of two witnesses.

WILLIAM L. BENNETT.

Witnesses:
J. L. IRWIN,
H. E. HARVEY.